Dec. 9, 1941.   W. R. COOTE ET AL   2,265,518
FLEXIBLE WALKING BEAM
Filed Aug. 13, 1940   2 Sheets-Sheet 1
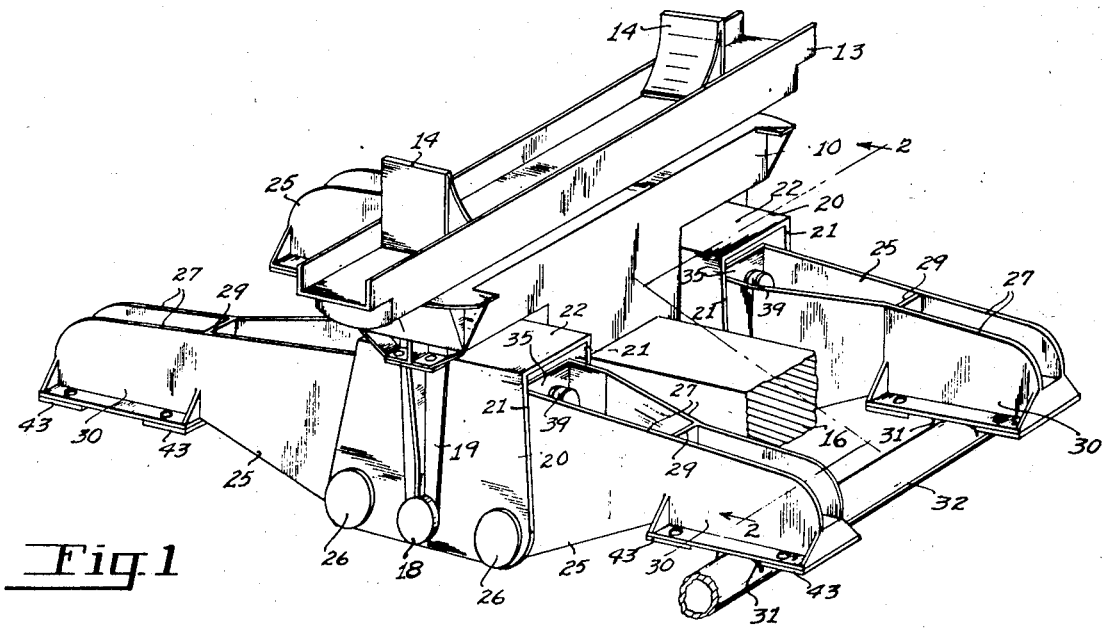
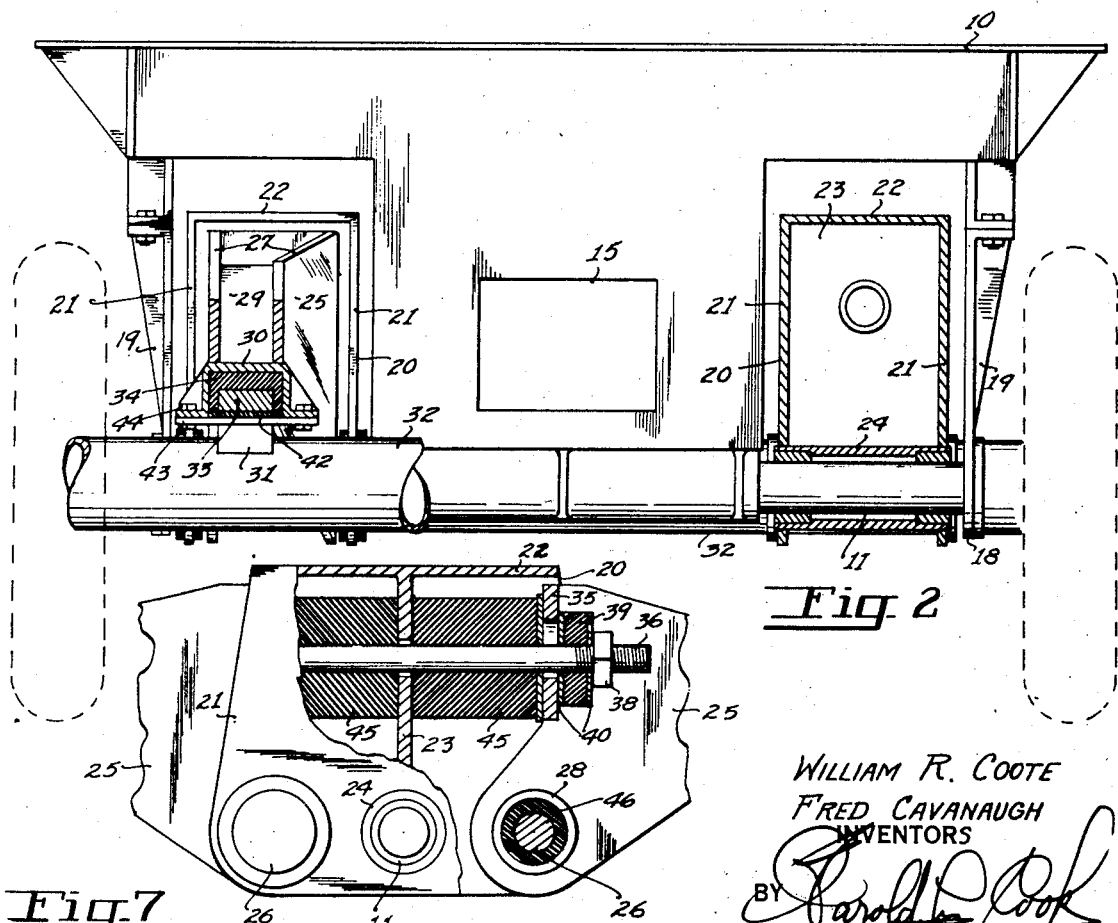
WILLIAM R. COOTE
FRED CAVANAUGH
INVENTORS
BY
ATTORNEY Dec. 9, 1941.  W. R. COOTE ET AL  2,265,518
FLEXIBLE WALKING BEAM
Filed Aug. 13, 1940  2 Sheets—Sheet 2
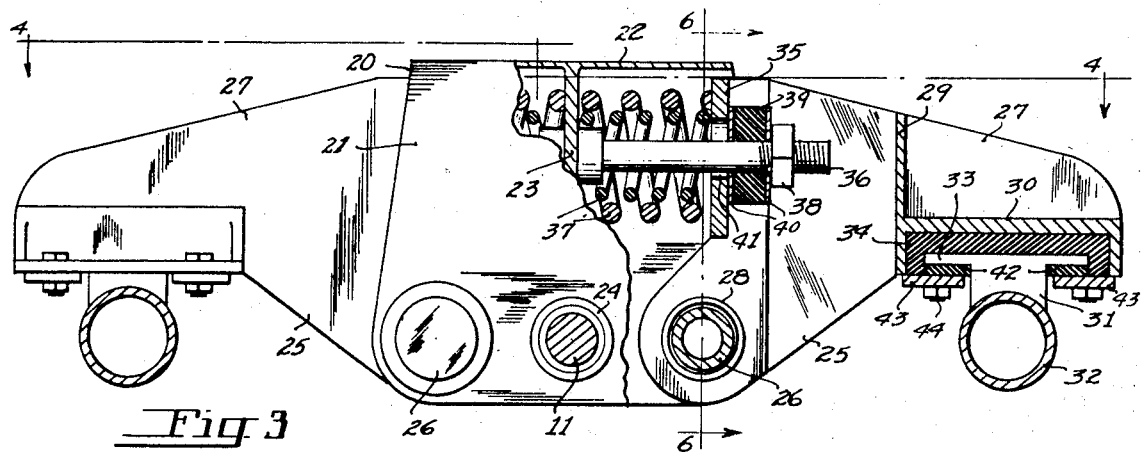
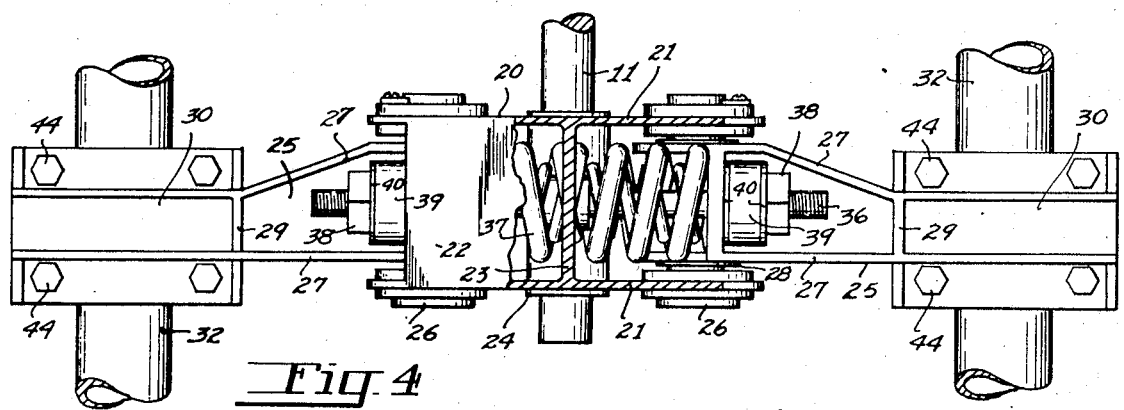
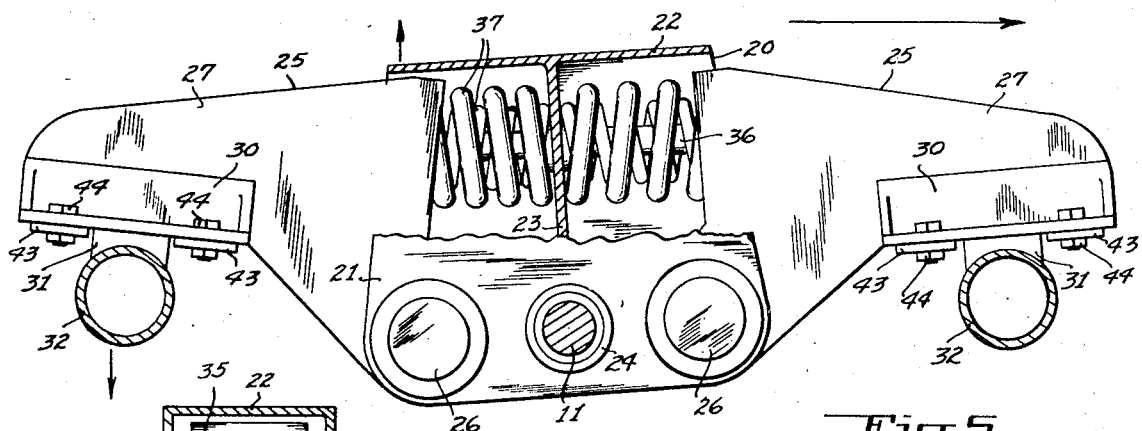
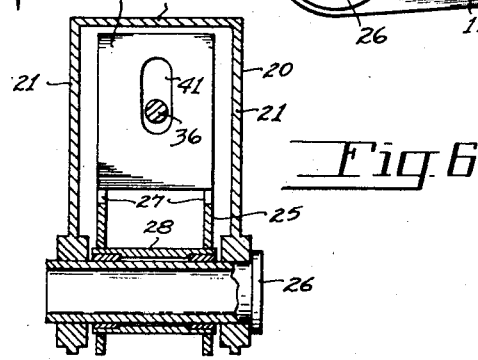
WILLIAM R. COOTE
FRED CAVANAUGH
INVENTORS
ATTORNEY Patented Dec. 9, 1941

2,265,518

UNITED STATES PATENT OFFICE 2,265,518

FLEXIBLE WALKING BEAM

William R. Coote and Fred Cavanaugh, Dallas, Oreg.

Application August 13, 1940, Serial No. 352,384

11 Claims. (Cl. 280—124)

This invention relates to load carrying vehicles, and has particular reference to the running gear and spring suspension of such vehicles. More particularly, the invention relates to vehicles having axles arranged in pairs and mounted on flexible walking beams, and forming therewith a truck.

The invention is embodied in a vehicle truck wherein a pair of wheel carrying axles are carried upon the opposite ends of flexible walking beams. Each walking beam comprises a frame member rotatably journaled upon the cross-shaft of the truck and carrying pins or gudgeons in its end portions and in spaced apart relation to the truck shaft, upon each of which is journaled a rocker beam. Mounted upon the free end of each rocker beam is a wheel carrying axle. A horizontally disposed coil spring is positioned between the central frame of the walking beam and the adjacent end of each rocker beam, these springs being preloaded to accommodate the expected load carrying capacity of the truck. The invention is herein illustrated and described as a truck or trailer such as may be employed in the logging industry.

A difficulty experienced in the operation of vehicles having trucks equipped with wheel carrying axles arranged in pairs and mounted upon walking beams or conventional leaf springs is that when the brakes are applied to stop the vehicle, the truck tends to pivot upon the foremost wheel carrying axle in such manner that the weight of the load is momentarily shifted thereto, causing the rear wheels to lose their normal traction with the ground surface. The result is that the application of the vehicle brakes causes greater wear on the foremost wheels of the truck, since these wheels are the ones which assume the greater burden in stopping the vehicle. The invention is designed to overcome this difficulty and to provide a construction wherein the wheel carrying axles are connected together by means of flexible walking beams so constructed that both front and rear wheels of the truck are caused to assume their full share of the burden of stopping the vehicle whenever the brakes are applied.

Other advantages of the invention are set forth more fully in connection with the detailed description which follows hereinafter, it being an object of the invention to provide a walking beam for a vehicle truck in which a novel form of spring suspension provides a greater degree of flexibility than heretofore found in this type of construction.

A further object of the invention is to provide a flexible walking beam for a vehicle truck, so constructed as to cause both front and rear wheels of the truck to assume their full share of the burden of stopping the vehicle whenever the brakes are applied.

A further object of the invention is to provide a vehicle truck in which a novel form of spring suspension eliminates side sway of the load carried upon the truck.

A further object of the invention is to provide a truck for load carrying vehicles employing flexible walking beams, so constructed that the weight of the load carried upon the truck is equally distributed to the respective wheels.

A further object of the invention is to provide a novel form of spring suspension for vehicle trucks, thereby effecting a very considerable reduction in the weight of the truck, and with which the alignment of the road engaging wheels is more easily accomplished and maintained than in prior structures.

A further object of the invention is to provide a vehicle truck capable of carrying enormous tonnage; which is economical to manufacture and maintain; and which requires a minimum of time and labor to assemble and repair.

To the accomplishment of the recited objects and others coordinate therewith, the preferred embodiment of the invention resides in the construction and arrangement of parts hereinafter described, illustrated in the accompanying drawings, and embraced within the scope of the appended claims.

In the drawings:

Figure 1 is a perspective view of a vehicle truck embodying the present invention.

Figure 2 is an end elevation of the truck, taken on the line 2—2 of Figure 1.

Figure 3 is a side elevation of a walking beam such as employed in the truck illustrated in Figure 1, certain parts being broken away for greater clarity, and certain parts being in section.

Figure 4 is a plan view of the walking beam shown in Figure 3, the cover plate for the saddle member being broken away to show the internal construction.

Figure 5 shows the action of the walking beam at the time brakes are applied to the ground engaging wheels, the vehicle being propelled in the direction of the arrow.

Figure 6 is a transverse section of the walking beam, taken on the line 6—6 of Figure 3.

Figure 7 is a fragmentary side elevation of a walking beam embodying the principles of the invention, illustrating a modified form of construction.

A truck embodying the principles of the present invention may comprise a frame 10 mounted upon a cross-shaft 11. As illustrated in the drawings, a channel iron member forming a bunk 13 is mounted on the frame 10, and adjustable lengthwise of the bunk are chocks 14—14. Centrally of the frame 10 is an aperture 15 for receiving a reach pole 16.

Each extreme end portion of the shaft 11 is supported by a collar 18 carried by a depending bracket 19 bolted to respective end portions of the frame 10. Mounted upon each end of the shaft 11 and positioned between the respective depending brackets 19 and the central portion of the frame 10 is a box-like frame or saddle 20 forming a part of a walking beam. Each saddle 20 is made up of side plates 21 held rigidly in spaced apart relation by means of a cover plate 22 and a vertically disposed transverse plate 23. A sleeve bearing 24 is terminally welded to the side plates 21 of each saddle 20, and to the lower edge of the transverse plate 23, and forms the journal for the shaft 11.

In each end of the saddle 20 is mounted a rocker beam 25, each rocker beam being journaled upon a pin 26 disposed transversely of the saddle 20. Each rocker beam 25 comprises side plates 27 having formed therewith transverse stiffening plates 29 and a sleeve bearing 28, which forms the journal for the pin 26. At the outer end of each rocker beam is a housing 30 having an opening in its lower face and adapted to receive therein a bearing member 31 mounted upon the wheel carrying axle 32. Each of the bearing members 31 is provided with a load bearing surface 33, and mounted in said housing 30 and substantially enclosing said load bearing surface 33 is a resilient cushioning means. The cushioning means comprises a box-like cushioning member 34 open only at its lower face. The cushioning member 34 is thicker in cross section at the top and ends than on the sides, to provide the most resilient bearing surface where the stress is greatest. In the illustrated embodiment the bearing members 31 are T-shaped, and positioned under each end of the load bearing surface 33 is a rubber block 42. Plates 43, secured to the housing 30 by bolts 44, maintain the bearing members in position within said housings and secure the wheel carrying axles 32 to the rocker beams 25.

In the construction hereinabove described, the vehicle is carried upon flexible walking beams which are formed by the saddles 20 and the rocker beams 25—25 mounted in respective end portions thereof. The wheel carrying axles 32—32 are carried upon the outer ends of the rocker beams 25—25 in the manner hereinabove described. By this construction the load carried upon the vehicle shaft 11 is transferred to the saddles 20 and from thence through the rocker beams onto the wheel carrying axles 32.

Each rocker beam 25 is equipped at its inner end with a transverse end plate 35, and disposed intermediate the transverse plate 23 of the saddle 20 and each one of the end plates 35 of the rocker beams are horizontally mounted double coil compression springs 37. Extending through aligned apertures 41 in the end plates 35 and through an aperture in the plate 23 of the saddle is a bolt 36, each pair of springs 37 encircling the bolt 36 and being held in horizontal position thereby. Threaded onto each projecting end of the bolt 36 is a nut 38, and positioned between each nut 38 and each end plate 35 is a resilient bumper 39, preferably made of rubber, each end surface of the bumper being protected by metal washers or bumper plates 40. The bolt 36 and nuts 38 provide a tension adjustment for the springs 37, and the resilient bumpers 39 provide a snubbing action. The aligned apertures 41 in the end plates 35 are so shaped as to permit relative vertical movement between the bolt 36 and the end plates 35, whereby the rocker beams are permitted a limited pivotal movement about the pins or gudgeons 26, the opening being too narrow, however, to permit the passage of the resilient bumper 39 and bumper plates 40. The springs 37 are preloaded to prevent them from being fully compressed when the vehicle is loaded, the action of the springs being to hold each rocker beam 25 in horizontal position, against the anchorage provided by the bolt 36 and the opposite rocker beam, and against the compressing action exerted by the load on the trailer.

The construction hereinabove described embodies a vehicle truck mounted upon flexible walking beams having wheel carrying axles in tandem relation. As has been suggested hereinabove, when brakes are applied to tandem wheels mounted upon walking beams, or upon conventional type leaf springs, the truck tends to pivot upon the front axle, i. e., the axle upon which is mounted the foremost wheels of the truck. The result is, therefore, that while the foremost wheels tend to grip the ground surface, the tendency for the truck to pivot on the foremost axle whenever the brakes are applied tends to lift the rearmost wheels out of engagement with the ground surface, thereby reducing their braking action. This disadvantage, inherent in trucks mounted on dual axles, is fully met in the present invention by the provision of flexible walking beams which insure that both fore and rear sets of wheels act together and simultaneously to stop the vehicle whenever the brakes are applied.

Reference is made to Figure 5, wherein is illustrated the action of each walking beam at the moment brakes are applied to the ground engaging wheels. Considering the vehicle to be moving in the direction indicated by the arrow at the top of Figure 5, the application of brakes to the foremost wheels (not shown) will cause the rocker beam 25 mounted on the foremost wheel carrying axle 32 to tend to pivot on said axle 32 so as to be rotated thereabout. This pivotal action or forward tilting of the forward rocker beam 25 will tend to lift the front end of the saddle 20, this action being illustrated in Figure 5 by the upwardly pointing arrows. Moreover, because the rocker beams are independently mounted, application of the brakes to the rearmost wheels of the truck tends to cause the rear rocker beam 25 to pivot about the rear wheel carrying axle 32 so that its forward end is urged in a downward direction as indicated by the arrow. Thus, while the foremost rocker beam 25 tends to pivot about the forward wheel carrying axle 32 in a direction tending to lift the forward end of the saddle 20, the simultaneous application of brakes to the rear wheels of the truck tends to cause the rear rocker beam 25 to pivot about the rear wheel carrying axle 32 in such manner that the rearward end of the saddle 20 is urged downwardly. The action just described is assisted by the fact that the saddle 20 is rotatably journaled at its center upon the truck shaft 11 and responds readily to the tilting motion imparted by the front and rear rocker beams 25. The above described action tends momentarily to lessen the load on the front springs 37 and to transfer additional load to the rear springs 37, and to the rear wheels. The result is that whenever the brakes are applied to the wheels, the action of the walking beam urges the rear wheels into greater tractive relation with the ground surface, whereby these wheels are caused to assume their full share of the burden of stopping the vehicle.

Figure 7 illustrates a modified form of construction of walking beam wherein the double coil springs 37 are replaced by a rubber block 45 which functions in the same manner as the springs 37 and possesses the same rebound characteristics. The bolt 36 passes through the block 45 and serves to hold the same in proper position relative to the transverse plate 23 of the saddle 20 and the end plate 35 of each rocker beam 25.

In Figure 7 the sleeve bearing 28 for the pin or gudgeon 26 is illustrated as being equipped with a rubber bushing 46 in place of the metal bushings usually employed in such bearings. An advantage of this construction is that the usual careful machining of the sleeve bearing to receive metal bushings is unnecessary, the rubber bushing accommodating itself to any roughness in the sleeve. Although but one of the sleeve bearings is illustrated in section in Figure 7 to show the rubber bushing 46, it will be appreciated that this same construction may be used wherever bushings are employed in the walking beam.

An important advantage of the present construction is the fact of a more equal distribution of the load to the wheel carrying axles, and consequently to the ground engaging wheels, than has been possible with conventional types of dual axle trucks. The construction illustrated is particularly adapted for hauling loads of excessive tonnage, such as represented by loads of giant Douglas fir or ponderosa pine logs, such loads often amounting to as much as 125,000 pounds weight, and equal distribution of such a load to all parts of the load carrying elements is a vital necessity.

In the present construction the springs 37 are very much shorter than the conventional leaf springs usually mounted upon the wheel carrying axles and extending from one such axle to the other. The resiliency offered by the springs 37 in the present construction is no less than that of the conventional leaf springs, and in fact the combination of separately mounted rocker beams and coil springs provides a greater flexibility than ordinarily is found in conventional types of truck construction. Moreover, the absence of the long, heavy leaf springs and spring shackles has greatly reduced the weight of the truck, the coil springs 37 in the present construction representing but a small fraction of the weight of leaf springs and spring shackles for which they are substituted.

Of particular importance in the handling of extremely heavy loads, and particularly where such loads may extend several feet above the frame of the truck, is the fact that the present construction eliminates side sway. The central frame or saddle 20 of each walking beam is mounted upon a sleeve bearing 24 having a bearing surface extending for a considerable distance along the truck shaft, and the rocker beams which carry the wheel carrying axles are mounted upon sleeve bearings 28 coextensive with the sleeve bearing 24. Moreover, instead of being mounted upon framework resting directly upon relatively long springs, as in conventional type trucks, the load is carried upon a frame mounted directly upon the vehicle axle, the springs being secondary in their relation to the load supporting elements, rather than primary thereto.

It will be apparent that the invention provides a truck possessing a number of important structural advantages. At the same time it is simply constructed, requiring few parts, which are readily and inexpensively assembled and easily and quickly repaired. It will be obvious to those skilled in the art that the illustrated embodiment of the invention may be variously changed and modified, and that features thereof may be taken singly or collectively and embodied in other combinations than those illustrated without departing from the spirit of the invention or sacrificing any of the advantages thereof. It is to be understood, therefore, that the foregoing is to be interpreted as illustrative only, and not in a limiting sense, except as required by the prior art and by the spirit of the appended claims.

Having now described our invention and in what manner the same may be used, what we claim as new and desire to protect by Letters Patent is:

1. A truck having a shaft, walking beams pivoted intermediate their ends upon said shaft, one upon each side of said truck, each said walking beam comprising a central frame member rotatably journaled on said shaft, a partition mounted transversely of said frame member for oscillation therewith, a rocker beam pivotally mounted in each end portion of said frame member, a horizontally disposed coil spring between said partition and the adjacent end of each said rocker beam, a snubber for holding said rocker beams against the expansion of said springs, and a wheel carrying axle mounted on each said rocker beam.

2. A walking beam, comprising a central frame member, a shaft journaled in said frame and forming a pivot about which said frame member may be rotated, a rocker beam rotatably journaled in each end of said frame member, a horizontally disposed coil spring bearing at one end on one of said rocker beams and at its other end on said frame member, and snubbing means for snubbing said spring.

3. A walking beam comprising a frame rotatably journaled on a shaft, a rocker beam pivotally mounted in each end portion of said frame, a bolt extending loosely through said frame and interconnecting said beams, a horizontally disposed coil spring mounted on said bolt between said frame and the adjacent end of each said rocker beam, a snubber for holding said rocker beams against the expansion force of said springs, and a wheel carrying axle mounted in each said rocker beam.

4. A walking beam comprising a central frame member, a shaft journaled in said frame and forming a pivot about which said frame member may rotate, a partition mounted transversely of said frame member for oscillation therewith, a rocker beam pivotally mounted in each end portion of said frame member, a horizontally disposed coil spring mounted between said partition and the adjacent end of each said rocker beam, means interconnecting said beams whereby each beam serves as an anchorage for the opposite beam and limits the action of said springs, and a wheel carrying axle mounted on each said rocker beam.

5. A walking beam comprising a frame, a rocker beam rotatably journaled in each end of said frame, a compressible rebound member mounted between said frame and each one of said rocker beams, a bolt extending loosely through said frame and through said rebound members and interconnecting said beams whereby each said beams serves as an anchorage for the opposite beam and limits the action of said rebound members.

6. In a walking beam, a frame, a shaft, said frame being rotatably mounted about said shaft, a rocker beam journaled in each end of said frame, a wheel carrying axle mounted in each said rocker beam, and independently acting spring means mounted between each said rocker beam and said frame whereby, upon application of an external stress, each said rocker beam reacts independently of the opposite rocker beam.

7. In a walking beam, a frame, a shaft, said frame being rotatably mounted about said shaft, a rocker beam journaled in each end of said frame, a wheel carrying axle mounted in each said rocker beam, and independently acting resilient means mounted between each said rocker beam and said frame whereby, upon application of an external stress, each said rocker beam reacts independently of the opposite rocker beam.

8. In a walking beam, a frame, a shaft, said frame being rotatably mounted about said shaft, a rocker beam journaled in each end of said frame, a wheel carrying axle mounted in each said rocker beam, independently acting resilient means mounted between each said rocker beam and said frame whereby, upon application of an external stress, each said rocker beam reacts independently of the opposite rocker beam, and means interconnecting said rocker beams whereby each beam acts as an anchorage for the opposite beam.

9. In a vehicle running gear, a shaft, a frame rotatably mounted about said shaft, an arm pivotally mounted at one of its ends in said frame and carrying ground engaging means at its other end, pressure responsive means mounted between said frame and said arm, and means imposing a force on said frame equal and opposite to that imposed thereon by said arm, whereby said gear is maintained in substantial equilibrium.

10. In the construction defined in claim 9, said pressure responsive means including a body of resilient and deformable rubber mounted between said frame and said arm.

11. In the construction defined in claim 9, said pressure responsive means including spring means mounted between said frame and said arm.

WILLIAM R. COOTE.
FRED CAVANAUGH.